United States Patent [19]

Shedrow

[11] Patent Number: 4,618,225

[45] Date of Patent: Oct. 21, 1986

[54] LENS HOLDER AND CARRIER FOR SAFETY MASKS

[76] Inventor: Sidney Shedrow, 202 E. Gaston St., Savannah, Ga. 31401

[21] Appl. No.: 777,959

[22] Filed: Sep. 19, 1985

Related U.S. Application Data

[63] Continuation-in-part of Ser. No. 459,414, Jan. 20, 1983, Pat. No. 4,542,965.

[51] Int. Cl.⁴ .................. G02C 7/08; G02C 5/04; G02C 5/02
[52] U.S. Cl. .................................. 351/57; 351/47; 351/128; 351/130
[58] Field of Search ............ 351/47, 48, 57, 58, 351/59, 128, 130; 2/429, 441, 443

[56] References Cited

U.S. PATENT DOCUMENTS 2,818,774  1/1958  Olnhauser .................... 351/57
3,236,579  2/1966  Evans .......................... 351/47

Primary Examiner—Rodney B. Bovernick
Attorney, Agent, or Firm—James B. Middleton

[57] ABSTRACT

A lens holder for visual correction within a safety mask. The bridge between the two lenses is bendable to allow contouring of the lenses to fit a person's face and a curved face plate on the mask. A hole in the bridge serves to receive a post on a bracket fixed in the mask. A hinged carrier allows a variety of brackets to be used, and the hinge is bifurcated to facilitate bending of the bridge. The lens holder is formed of an elastomeric thermoplastic, so portions of the carrier assembly are easily removable for use of the lens holder in a variety of different brackets for different safety masks.

4 Claims, 10 Drawing Figures

U.S. Patent  Oct. 21, 1986  Sheet 1 of 2  4,618,225
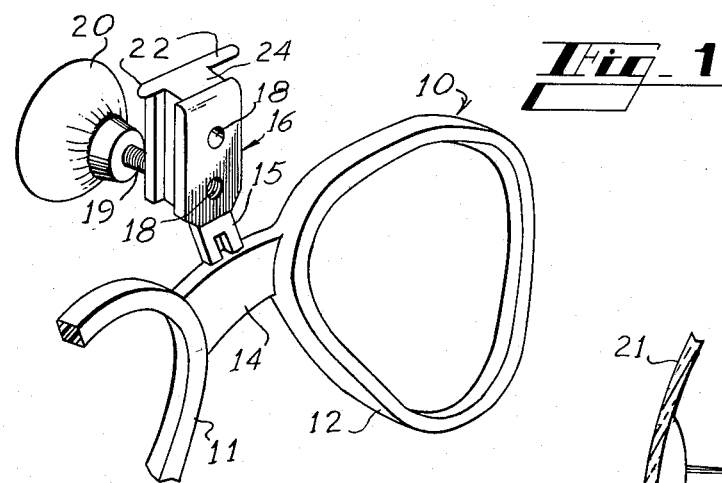
Fig_1
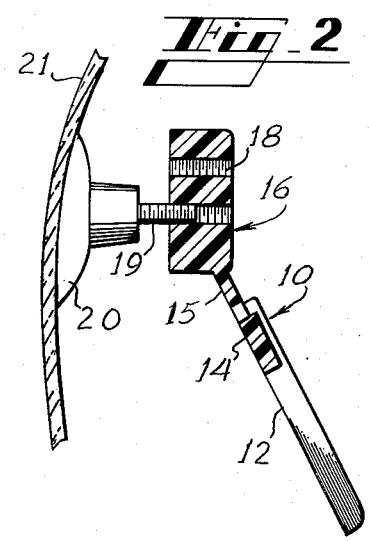
Fig_2
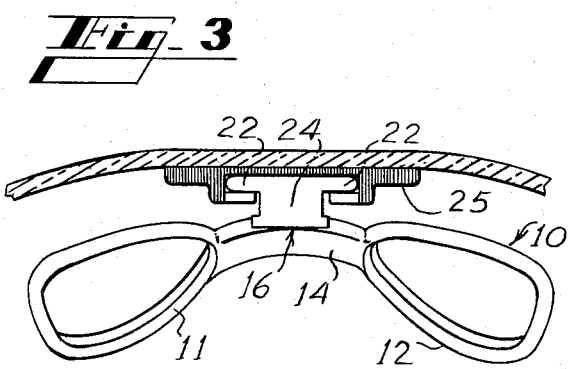
Fig_3
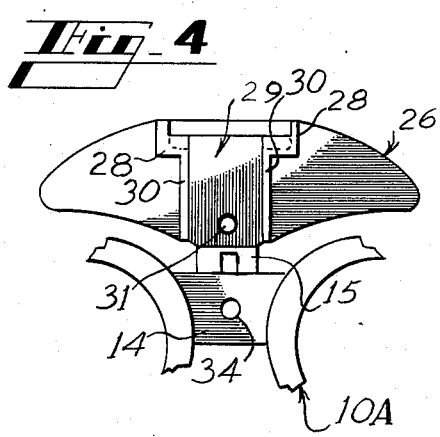
Fig_4
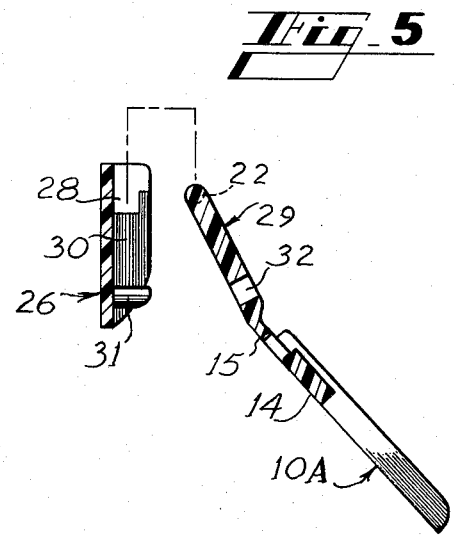
Fig_5

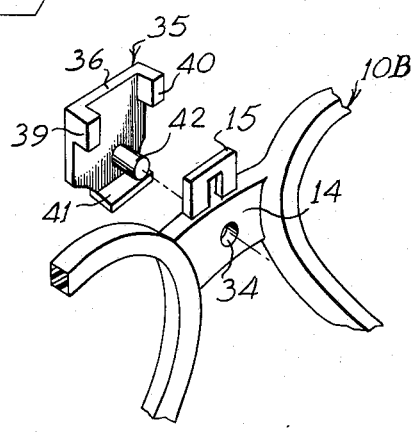
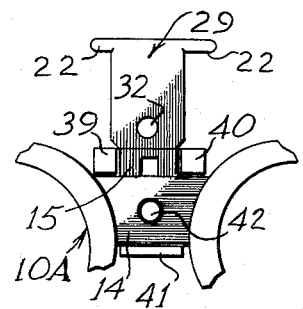
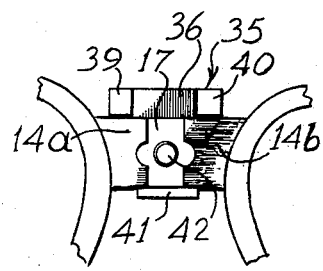
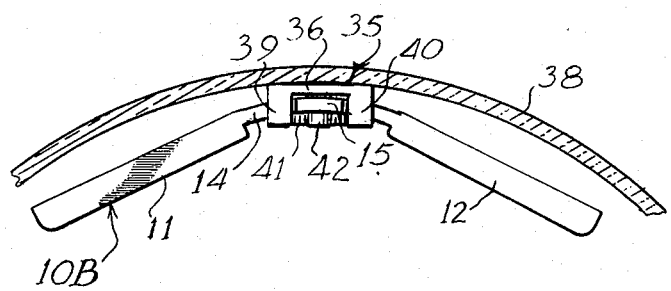
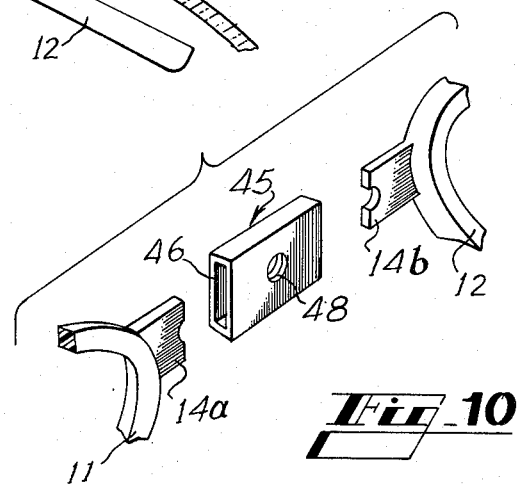

LENS HOLDER AND CARRIER FOR SAFETY MASKS

CROSS REFERENCE TO RELATED APPLICATIONS

This is a continuation-in-part of the copending application of the same inventor, filed Jan. 20, 1983, Ser. No. 459,414, now U.S. Pat. No. 4,542,965 on Sept. 24, 1985 titled "Suction Cup Mount for Eye Glasses".

INFORMATION DISCLOSURE STATEMENT

It is well known that a great percentage of the population requires some form of visual correction to see with maximum clarity. In the past, it has been the usual thing for a person requiring a visual correction simply to do without the visual correction when the person must wear a safety mask because of difficulties such as the lack of a mounting means in the mask, and the lack of sufficient space within the mask to wear ordinary eye glasses. While there has been some prior effort at providing lens holding means within the safety mask, the prior art efforts have not been satisfactory in all cases. The above identified copending application, and prior patents cited therein, disclose commercially successful lens holding means for safety masks, but all of the lens holders there disclosed are subject to some limitations.

The prior art lens holders by other than the present inventor utilize very unstable mounting means, requiring that the substantially conventional eye glasses fit on a persons's face in conventional fashion. This renders the eye glasses quite uncomfortable, and further provides a hazard in that the mounting means can easily damage the person if an accident occurs.

The prior patent to Shedrow, U.S. Pat. No. 4,349,251, discloses a useable lens holding means; but, in order to use this particular lens holder and mounting, sufficient space is required in the safety mask for a considerable amount of vertical movement to engage the lens holder with the mounting bracket. Furthermore, this device did not allow contouring, or wrapping around the face of the wearer, in the event the face plate of the mask was so contoured.

The above identified copending application discloses an improved lens holder, and relates to the use of a suction cup as a mounting device to fix the lens holder to the safety mask. This device also lacks some adjustment that is desirable, and still requires a sufficiently high volume mask in order to have the required space between the wearer's face and the face plate of the mask.

SUMMARY OF THE INVENTION

This invention relates generally to lens holding means for use in safety masks, and is more particularly concerned with a versatile lens holding means and mounting means therefor. Safety Mask To Include: "Full Face Respirator Face Mask", "Scuba Mask", "chemical splash goggle", "Ski goggle", "Welding helmet" and the like.

The present invention provides lens holding means including a pair of lens holders having a bridge therebetween, the bridge being bendable to allow the individual lens holders to lie in planes angularly related to each other. Carrying means is provided for selectively fixing the bridge to the face plate of a safety mask.

In one embodiment of the invention, an additional hinge member is fixed to the bridge, and a carrier is attached to the bridge. In another embodiment of the invention, the bridge defines an opening therein for cooperation with a mounting bracket. The present invention is such that one form of device made in accordance with the present invention will be useable in virtually any safety mask, providing a readily removable lens holding means for use in the mask.

BRIEF DESCRIPTION OF THE DRAWINGS

These and other features and advantages of the present invention will become apparent from consideration of the following specification when taken in conjunction with the accompanying drawings in which:

FIG. 1 is a perspective view, partially broken away, showing one embodiment of the present invention having a hinged carrier fixed to the bridge of the lens holding means;

FIG. 2 is a cross-sectional view taken vertically through the device shown in FIG. 1;

FIG. 3 is a top plan view showing the lens holding means of FIG. 1 engaged with a bracket rather than a suction cup;

FIG. 4 is a fragmentary front elevational view of lens holding means showing a different embodiment of the present invention utililzing a hinged carrier connected to the bridge;

FIG. 5 is a cross-sectional view taken vertically through the device shown in FIG. 4, and showing the carrier removed from the bracket;

FIG. 6 is an exploded perspective view showing a lens holder similar to that shown in FIGS. 4 and 5, but with the carrier portion removed, and showing a different form of mounting bracket;

FIG. 7 is a top plan view of the device shown in FIG. 6, and illustrating the contouring of the lens holders to conform to the mask face plate;

FIG. 8 is a front elevational view similar to FIG. 4, and showing the lens holding means of FIG. 4 received in the bracket of FIG. 6;

FIG. 9 is a view similar to FIG. 8 and illustrating a widened bridge for the lens holding means; and, FIG. 10 is an exploded view illustrating another means for widening the bridge of the lens holding means.

DETAILED DESCRIPTION OF THE EMBODIMENTS

Referring now more particularly to the drawings, and to those embodiments of the invention here presented by way of illustration, the device shown in FIG. 1 of the drawings is quite similar to the device illustrated in the above identified copending application, and includes the lens holding means 10 having lens holders 11 and 12 for left and right eyes respectively. A bridge 14 extends between, and connects, the two lens holders 11 and 12. A hinge 15 is connected to the upper surface of the bridge 14, and is also connected to a carrier 16. The carrier 16 is provided with one or more holes 18 for receiving a screw 19 on a suction cup 20. As in the copending application, the suction cup 20 can be fixed to the face plate 21 of a safety mask, and the suction cup will hold the lens holding means 10 in position before the wearer's eyes.

Also as in the copending application, the carrier 16 includes a pair of tabs 22 to allow the carrier 16 to be used with a more conventional bracket such as the one disclosed in U.S. Pat. No. 4,349,251.

The difference in the present invention with respect to the carrier 16 is that the carrier 16 includes a spacer designated at 24 to provide a greater thickness for receiving the screw 19. With particular attention to FIG. 2, it will be seen that the screw 19 can be threaded in or out of the carrier 16 to vary the distance of the carrier 16 from the face of the person wearing the mask. It is important to note that, even with the screw 19 threaded all the way into the holes 18 of the carrier 16, the screw 19 will not protrude completely through the carrier 16.

As here illustrated, and as is preferred, the carrier 16 is integrally molded, and the bridge 14 and hinge 15 are thin enough to be bendable. It should also be realized that the lens holding means 10 will be molded of a plastic material having elastomeric properties so the material itself provides the desired bending. Those skilled in the art will be aware of numerous materials that will serve the function desired, but it has been found that nylon works extremely well, and of course nylon is well known for use in eye glass frames and the like. With this in mind, it will be noted that the hinge 15 is bifurcated at its point of connection with the bridge 14. In order for the bridge 14 to bend about a generally vertical line to allow the lens holders 11 and 12 to bend around the face of the wearer, the hinge 15 needs the bifurcated lower end to allow easy motion of the lens holders 11 and 12 by bending of the bridge 14. This arrangement is discussed in more detail in the above identified copending application, and that disclosure is incorporated herein by reference.

Looking briefly at FIG. 3 of the drawings, the lens holding means 10 is shown with the carrier 16 engaged with a bracket 25. By using the carrier 16 having the spacer 24, it will be seen that the lens holders 11 and 12 can be moved somewhat closer to the face of the wearer; and, the lens holders 11 and 12 can be bent around the face of the wearer by bending the bridge 14 as is indicated.

Some safety masks are limited in vertical distance of the face plate and of the mask itself. Since brackets such as the bracket 25 have generally required vertical motion for proper engagement and disengagement, the carrier such as the carrier 16 sometimes cannot be used. The embodiment of the invention shown in FIGS. 4 and 5 of the drawings provides the stability of a bracket such as the bracket 25, but without requiring the vertical motion. The bracket in FIGS. 4 and 5 is designated as 26, and includes the recesses 28 for receiving tabs such as the tabs 22 on the carrier here designated at 29. The bracket 25 also includes the side guide walls 30 to provide adequate stability once the lens holding means is secured in the bracket 26.

To allow the easy entry in this embodiment of the mounting means, it will be seen that there is a post 31 extending from the bracket 26 generally centrally between the side walls 30. The carrier 29 is provided with a mating opening 32. It will therefore be understood that the tabs such as the tabs 22 on the carrier 29 can be engaged with the recesses 28; and, these tabs can be used as an axis as the carrier 29 is pivoted down until the post 31 projects through the opening 32 in the carrier. With the sloped lower surface of the post 31, it will be understood that the dimensions can be quite close, and the camming action between the post 31 and the hole 32 will cause the carrier 29 to be tightly held between the tabs 22 and the post 31.

It should also be noted that the lens holding means here designated at 10A includes the hinge 15 and bridge 14. The bridge 14 has an additional hole 34 which will be discussed hereinafter.

Looking now at FIGS. 6 and 7 of the drawings, the lens holding means is designated at 10B, and there is the same bridge 14 having the hinge 15, and the bridge 14 contains the hole 34. It wil therefore be noted that the lens holding means 10B is precisely the same as the lens holding means 10A, but the carrier 29 has been removed. Since some safety masks do not have sufficient space to allow use of the carrier 29, the arrangement shown in FIG. 6 is provided in order to use less vertical space. The bracket is designated at 35 and includes a plate 36 for attachment to the face plate 38. On the two upper corners of the base plate 36, there are forward projections 39 and 40; and, at the lower edge of the base plate 36 there is a forwardly projecting ledge 41. Generally centrally between the projections 39 and 40 and the ledge 41, there is a post 42 extending perpendicularly from the base plate 36.

It will now be noted that the lens holding means 10B can be urged in a straight line towards the bracket 35, and the post 42 will be received through the hole 34. The hinge 15 will extend upwardly between the projections 39 and 40, and the lower edge of the bridge 14 will engage the ledge 41. The lens holding means 10B is therefore snugly held to prevent rotation, and a snug fit between the post 42 and the hole 34 will prevent inadvertent removal of the lens holding means 10B. Nevertheless, it will be understood that a simple rocking action will allow the lens holding means 10B to be removed when desired.

FIG. 7 illustrates the arrangement of FIG. 6 mounted on the face plate 38 of a safety mask. It should especially be noted that the bridge 14 is curved so the lens holding means 10B has been contoured to the wearer's face. Considering the mechanical arrangement of the post 42 with the hole 34, it will be realized that this contouring of the lens holding means 10B will deform the hole 34 somewhat, and this will render the engagement of the hole 34 with the post 42 more secure.

Attention is next directed to FIG. 8 of the drawings to illustrate the versatility of the arrangement disclosed herein. It will be seen in FIG. 8 that the lens holding means 10A is shown secured to the bracket 35. Since the lens holding means 10A has the hole 34 in the bride 14, this bridge can receive the post 42 to secure the lens holding means 10A to the bracket 35. The carrier 29 projects above the bracket 35; but, if the mask has space to allow the carrier to extend upwardly, the same lens holding means 10A can be used with different masks having brackets such as the bracket 35 and brackets such as the bracket 26.

Some masks have very low volume, and have a wide purge extending around and sealing over the nose of the wearer. This purge is sometimes so wide that the lens holders 11 and 12 will not seat properly over the purge and allow the lens holding means to be properly placed with respect to the wearer's eyes. The solution to this problem is to lengthen the bridge 14, disposing the lens holders 11 and 12 farther apart. Obviously, the lens holding means can be initially molded with wider bridges if desired; however, numerous separate mold cavities may be required, and this increases the capital investment in order to manufacture the lens holders. Two alternatives are shown in FIGS. 9 and 10, these being modifications of the lens holders as shown in FIGS. 1-8.

Looking at FIG. 9 of the drawings, the lens holders 11 and 12 are indicated, and the bridge 14 has been cut vertically to provide bridge portions designated at 14a and 14b. These bridge portions are then separated, and a separate bridge designated at 17 is glued to the bridge portions 14a and 14b. FIG. 9 illustrates this arrangement mounted in the bracket 35. It will be seen that the hinge 15 has also been removed, but the ledge 41 and the projections 39 and 40 adequately secure the lens holding means.

FIG. 10 illustrates the lens holders 11 and 12 and the bridge portions 14a and 14b. Rather than utilizing an additional bridge 17, the arrangement shown in FIG. 10 utilizes a specially made rectangular sleeve 45. The sleeve 45 has a central opening 46 sized to receive the bridge portions 14a and 14b. An appropriate adhesive or the like may be used to secure the bridge portions with the sleeve, and a hole 48 through the sleeve 45 will receive the post 42 of the bracket 35 as is shown in FIG. 9.

It will therefore be understood that the present invention provides a very simple device whereby minor variations of the structure allow tremendous versatility to allow the lens holding means to be utilized in virtually any safety mask. For low volume masks, the contourability of the lens holding means allows comfort and good vision, and the direct engagement of the lens holding means with the supporting bracket allows the lens holding means to be mounted in the mask without extraneous motions. So long as the mask has the required volume, the hinged carrier can be used to provide the pantoscopic adjustment if desired.

It will of course be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as defined in the appended claims.

I claim:

1. A lens holding means for supporting a pair of lenses within a safety mask before the eyes of the wearer of said safety mask, said safety mask having a face plate, said lens holding means comprising a pair of lens holders, a bridge extending between said pair of lens holders and fixed to both lens holders of said pair of lens holders for supporting said lens holders with respect to each other in generally the same plane, said bridge being bendable for allowing said lens holders to lie in planes angularly related to each other for contouring said lens holding means to fit the face of said wearer and to fit within said safety mask, said bridge including carrying means for supporting said bridge from said face plate of said safety mask, said carrying means comprising a hinge fixed to the upper edge of said bridge, and a carrier fixed to said hinge, said hinge being bifurcated at said bridge for facilitating said bending of said bridge, said carrier including tabs extending laterally therefrom, said carrier defining a hole therein between said tabs and said hinge, and further including a bracket fixed to said face plate of said safety mask, said bracket including recesses for receiving said tabs such that said carrier is rotatable about said tabs, and a post extending from said bracket and receivable through said hole in said carrier on rotation of said carrier against said bracket.

2. A lens holding means as claimed in claim 1, said bridge defining a second hole therein, a second bracket for selectively receiving said lens holding means, said second bracket including a base having a second post extending therefrom for being received in said second hole in said bridge, and forward extensions extending from said base parallel to said second post for engaging an edge of said bridge on each side of said hinge, the arrangement being such that said bracket can be fixed in a first safety mask and said second bracket can be fixed in a second safety mask, and said lens holder is selectively useable in said first mask and said second mask.

3. A lens holding means for supporting a pair of lenses, in combination with a safety mask including a face plate, the arrangement being such that said lens holding means supports a pair of lenses before the eyes of the wearer of said safety mask, said lens holding means comprising a pair of lens holders, a bridge extending between said pair of lens holders and fixed to both lens holders of said pair of lens holders for supporting said lens holders with respect to each other in generally the same plane, said bridge being bendable for allowing said lens holders to lie in planes angularly related to each other for contouring said lens holding means to fit the face of said wearer and to conform to said face plate of said safety mask, said bridge including carrying means for supporting said bridge from said face plate of said safety mask, said carrying means comprising a post fixed generally perpendicularly to said face plate, said bridge defining an opening therein for selectively receiving said post, and means adjacent to said post for preventing rotation of said bridge with respect to said post.

4. A lens holding means as claimed in claim 3, and further including a bracket, said bracket including a base fixed to said face plate of said safety mask, said post being fixed to said base and extending therefrom, said bracket including forward projections extending parallel to said post for engaging an edge of said bridge when said post is received through said opening in said bridge, said forward projections constituting said means for preventing rotation of said bridge.

* * * * *